L. H. KLOCKSIEM.
RESILIENT TIRE.
APPLICATION FILED AUG. 16, 1915.
1,214,174. Patented Jan. 30, 1917.
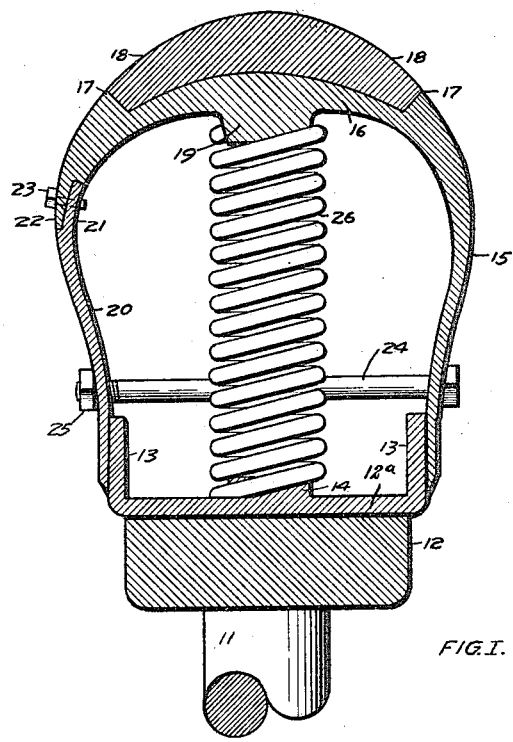
FIG. I.
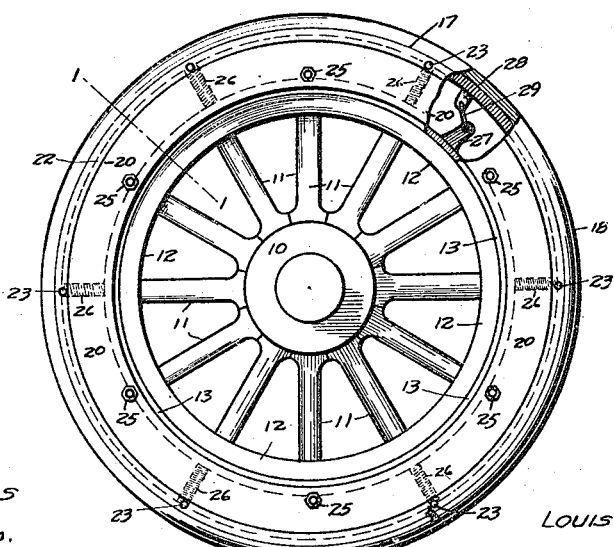
FIG. II.
WITNESSES
INVENTOR
LOUIS H. KLOCKSIEM
BY
ATTORNEYS

UNITED STATES PATENT OFFICE.

LOUIS H. KLOCKSIEM, OF PATON, IOWA.

RESILIENT TIRE.

1,214,174.  Specification of Letters Patent.  Patented Jan. 30, 1917.

Application filed August 16, 1915.  Serial No. 45,827.

*To all whom it may concern:*

Be it known that I, LOUIS H. KLOCKSIEM, a citizen of the United States, and resident of Paton, in the county of Greene and State of Iowa, have invented a certain new and useful Resilient Tire, of which the following is a specification.

The object of my invention is to provide a resilient tire for motor vehicles and the like.

A further object is to provide a tire employing mechanical resilient means, which tire is so constructed and arranged that it may be readily and easily mounted on an ordinary wheel, the parts of which may be readily and easily removed for replacing or repairing the resilient members.

Still a further object is to provide such a device using mechanical or resilient means, whereby the tire may be given resiliency without the use of air and may be of such material as to be puncture proof.

A further object is to provide suitable means for preventing the creeping of the tire on the wheel.

My invention consists in the construction, arrangement and combination of the various parts of the device whereby the objects contemplated are attained as hereinafter more fully set forth pointed out in my claim and illustrated in the accompanying drawings, in which:

Figure I shows a sectional view taken on the line 1—1 of Fig. II, and Fig. II shows a side elevation of a wheel equipped with a resilient tire embodying my invention, part of the tire being broken away showing the position of the lugs and the link for connecting the lugs, the springs being shown in dotted lines.

In the accompanying drawings, I have used the reference numeral 10 to indicate generally the hub of a wheel having the radially extending spokes 11, on the outer ends of which is the felly 12, on which is a rim 12ª comprising a channel having the outwardly extending flanges 13, and the spaced central outwardly extending lugs 14.

My improved tire comprises a resilient annular side member 15, formed on which is an annular circumferential tread member 16, having in its outer surface an annular groove 17 to receive a cushioning tire 18. On the interior of the tread portion 16 is a plurality of inwardly extending lugs 19.

I provide an annular detachable resilient side member 20 having a portion 21 overlapping the portion 22 at the edge of the tread member 16, and secured thereto by a plurality of bolts 23. It will be seen that my improved tire has substantially the same shape as an ordinary pneumatic tire, its outer portion at the sides of the tread portion being of greater transverse width than its portion adjacent to the rim, as shown in Fig. I.

The inner portions of the side members 20 and 15 are adapted to slide freely on the outer sides of the flanges 13. The members 15 and 20 are securely connected together by means of a plurality of bolts 24 and nuts 25, which bolts 24 are extended through the side members 15 and 20 at spaced intervals around the rim as shown in Fig. II. It will be seen that the members 15 and 20 are held against lateral spreading by means of the bolts 24, and the bolts 23. As is shown in Fig. I, the bolts 24 serve to limit the inner sliding movement of the inner parts 15 and 20, so that when a portion of the tire is on the ground the resilient members 15 and 20 will tend to spread out and will aid the spring in supporting the load. In other words, when a portion of the tire rests on the ground in supporting a load, the bolts 24 on the lower part of the wheel will engage the flanges 13, so that the members 16, 15 and 20, and the bolts 24 sustain part of the burden, and the springs 26 sustain part of the burden.

Mounted on the lugs 14 and 19 in succession around the tire are suitable coil springs 26, yieldingly tending to hold the tread portion 16 away from the rim 12ª.

Secured to the rim 12ª is an outwardly extending lug 27 shown in Fig. II, and near it there extends inwardly from the portion 16 an inwardly extending lug 28, shown in Fig. II. The lugs 27 and 28 are each pivotally connected to a link 29. By means of the lugs 27 and 28 and the link 29 the resilient tire is prevented from creeping around the wheel and is loosely connected with the rim 12ª.

In the practical use of my improved resilient tire, the parts are assembled in the way hereinbefore described, and the wheel is ready for use. The wheel will be supported by the springs 26 and the other resilient tire members and the inner parts of the parts 15 and 20 will slide freely on the flanges 13. Should any of the parts 26 become broken or weak or should it be necessary for any reason to repair or replace any of them, or any parts of my improved resilient tire, except the resilient cushioning tire 18, it is an easy matter to remove the tire by removing the bolts 24 and 23 and to repair or replace any of the parts. The members 15, 16 and 20 are of somewhat resilient metal, are puncture proof, and yet have the same general appearance as an ordinary puncture proof tire.

It will be understood that some changes may be made in the construction and arrangement of the parts of my improved resilient tire without departing from its essential features and purposes, and it is my intent to cover by this application any such changes which may be included within the scope of my claim.

I claim as my invention:

In a device of the class described, the combination of an outwardly opening channel-shaped rim, with a tire comprising a resilient annular side portion, and an annular tread portion, a removable annular resilient side member having one edge overlapping the edge of said tread portion, and detachably secured thereto, said side portion and said side member having parts slidably mounted on the flanges of said channel-shaped rim, bolts extended through the side portion and the side member, for holding them against spreading movement and adapted to limit their inward movement on said rim, resilient springs interposed between said tread portion and said rim, and means for preventing said tire from creeping on said rim.

Des Moines, Iowa, July 23, 1915.

LOUIS H. KLOCKSIEM.

Witnesses:
C. C. VAIL,
F. PAUL HARNED.

Copies of this patent may be obtained for five cents each, by addressing the "Commissioner of Patents, Washington, D. C."